E. E. CULLEN.
CAN UTENSIL.
APPLICATION FILED APR. 22, 1918.
1,280,675.
Patented Oct. 8, 1918.
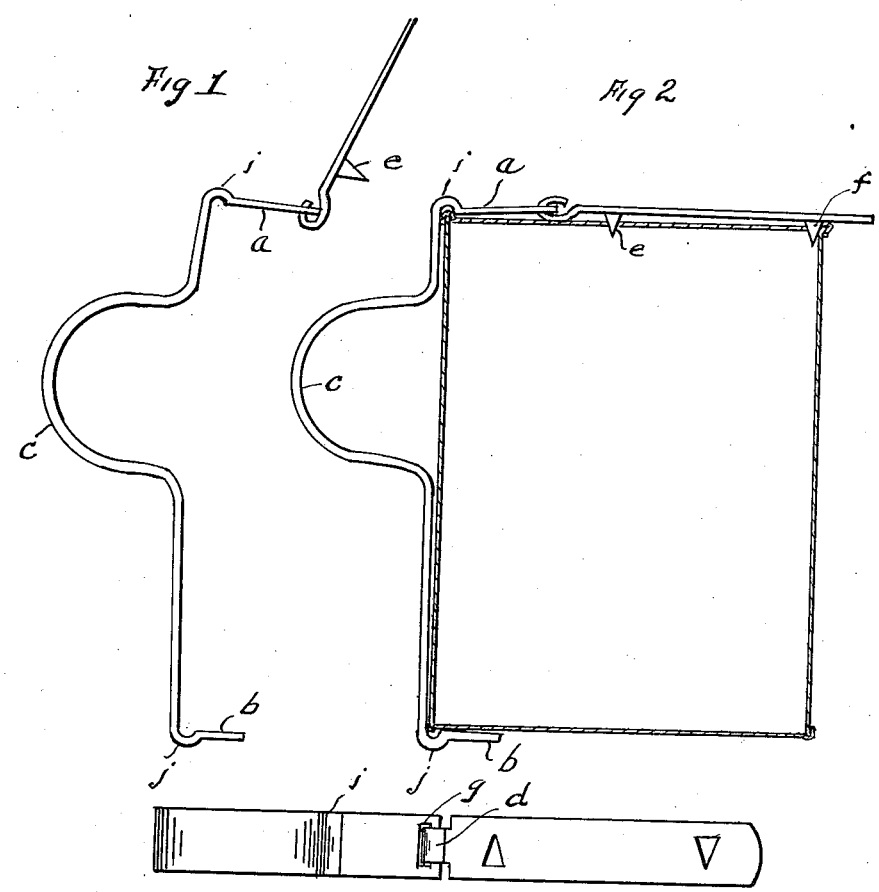
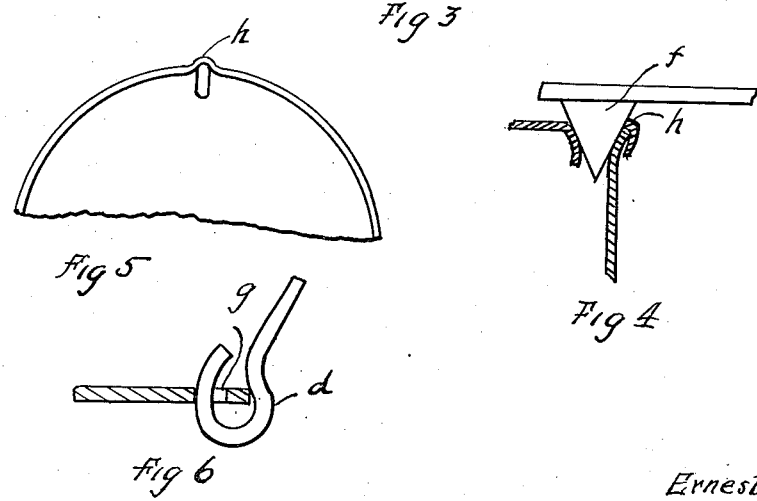
INVENTOR
Ernest E Cullen
BY
ATTORNEY

UNITED STATES PATENT OFFICE.

ERNEST E. CULLEN, OF ANCHORVILLE, MICHIGAN, ASSIGNOR OF ONE-HALF TO GEORGE E. VERNIER, OF FAIR HAVEN, MICHIGAN.

CAN UTENSIL.

1,280,675.  Specification of Letters Patent.  Patented Oct. 8, 1918.

Application filed April 22, 1918. Serial No. 229,943.

*To all whom it may concern:*

Be it known that I, ERNEST E. CULLEN, a citizen of the United States, residing at Anchorville, in the county of St. Clair and State of Michigan, have invented a new and useful Improvement in Can Utensils, of which the following is a specification.

This invention relates to a can utensil and more especially to a combined holder and perforator which is arranged to form a spout on the can. The device is more especially intended for holding a can of evaporated milk and perforating the top and forming a spout from a portion of the rim. The device not only serves this purpose but it serves the further purpose of plugging the holes in the top of the can when not in use to prevent the access of dirt, flies and the like.

In the drawings, —

Figure 1 is a side elevation of the utensil before it is sprung over the can.

Fig. 2 shows the utensil sprung over the can and an impaling member driven into the can top to form both a vent and a pouring spout.

Fig. 3 is a top view of the can utensil.

Fig. 4 is a fragmentary detail showing how the spout is formed from the rim.

Fig. 5 is a top plan view in fragment, of a can showing a spout and pour hole formed therein.

Fig. 6 is a detail showing my special form of hinge that serves to hold the impaling member in elevated position.

In the prior art combined can holding and can perforating devices for use in connection with evaporated milk cans are old, but most of these are rather expensive affairs, combining a complete casing or receptacle with a cover that is provided with perforating devices. Special provision has to be made to secure a suitable packing between the top of the can and the holding receptacle or else the milk will get in behind the can and sour and conditions become very unsanitary. Furthermore, some special provision is required in order to secure a suitable pouring action. This is usually provided by a special spout attached to the holding receptacle or else the perforating lugs themselves are part of a rather complex spout arrangement. These devices are relatively very much more expensive than the simple device that I have designed to effectively accomplish all these purposes.

The device comprises simply a pair of strips which are stamped into the proper shapes to accomplish the objects in view. One strip is made of steel that has a certain amount of spring and this is stamped into a combined handle and yoke, as shown in Fig. 1. It will be seen that the arms of the yoke $a$ and $b$ slightly tend together and that the center of the yoke is formed into a handle $c$ which serves not only the purpose of gripping the utensil but also serves to give amplitude to the spring action. The spring action obviously extends not only through the arms but through the entire yoke, of which this loop forming the handle is a part.

The other member of the device is simply a strip which is reduced in width and curled into a loop at $d$ to form one part of a hinge and spurs struck out at $e$ and $f$ to form a vent hole and a pour hole and spout respectively. The loop $d$ is threaded through the slot $g$, which is punched out of the end of the arm $a$ of the handle. This forms the hinge, which is detailed in Fig. 6. This loop $d$ is nicely calculated with respect to the breadth of the eye so that when raising the impaling member to the position shown in Fig. 6 the loop increases in width and consequently there is a binding action which will hold the impaling member in the position shown in Fig. 1. This allows the pouring of the contents of the can without holding back the impaling member with the hand and is a convenient and yet very simple arrangement.

Another most important feature of this utensil is that it absolutely eliminates the necessity of a special spout or pour apparatus, which is so common in the prior structures and makes them so expensive. These evaporated milk cans are substantially all of a standard width. By using a spur $f$ which is set in the impaling member so as to just strike the inside of the rim of the can and by shaping its outside edge into a wedge, this spur $f$ not only makes the perforation in the top of the can but it shoves the rim out as shown in Figs. 4 and 5 to form a spout $h$. This spout, it is true, is small but it is large enough for the flow that passes through the perforation in the top of the can and gives proper direction to the flow from the can, avoiding the provoking tendency of the milk to follow the surface of the can rather than leave the same in a small non-spreading stream.

A very important feature of the handle portion is its simplicity and efficiency in holding the can. The spring clamp itself would not do this in a satisfactory manner without the aid of the dings $i$ and $j$, which are sharp concavities in the strip where it turns from the upright portion into the arms $a$ and $b$ to form the yoke. These dings allow the arms to set practically flush on the top and bottom of the can and allows the strip to loop over the rim and get a grip on the inside of the rim that prevents the yoke from swinging sidewise on the can after it has been sprung into position. Obviously in twisting the handle must spring the arms and the weight of the can and contents when handled in an ordinary way will not have enough force to do this. This stabilizing arrangement is most desirable as obviously the wabbling of the can back and forth in the handle would make a device of this kind of little practical use. These dings, which are easily put into the strip in the stamping operation save the necessity of other more complicated devices, such as set screws or other clamping means to insure avoidance of lateral swing.

The utensil can easily be applied to the can by simply opening up the arms slightly (which is not difficult due to the amplitude of the spring arms formed by the loop portion that makes the handle), and slipping the yoke onto the can. The utensil may easily be removed from the can by twisting it off.

What I claim is:

1. A can utensil having a holding member for handling the can, and an impaling member which is provided with a spur calculated to both perforate the top of the can and push out a portion of the rim and form a spout in connection with such perforation.

2. A can utensil, comprising a holding member for holding the can and an impaling member operable in connection with the holding member and including a spur whose position on the impaling member and whose wedge-like outside edge is calculated to both perforate the can on the top and push out the rim at such perforation to form a pouring spout.

3. A can utensil, comprising a holding member adapted to handle the can and an impaling member hinged thereto and including a spur calculated to both perforate the top and push out the rim of the can to form a spout in connection with the pour hole.

4. A utensil for the purpose specified, having in combination, an impaling wing or cover having a pair of spurs, one of which forms a pour hole and the other a vent hole when the impaling wing or cover is forced against the can, and a holder securable to the can and having a handle portion, said holder and wing being provided with a hinging connection comprising a slot and a loop having an elliptical formation to cause the stock between the slot in the end of the holder to wedge in between the side walls of the loop when the cover is raised, for the purpose specified.

In witness whereof I have hereunto set my hand on the 15th day of April, 1918.

ERNEST E. CULLEN.